(12) United States Patent
Yeh

(10) Patent No.: US 7,310,050 B2
(45) Date of Patent: Dec. 18, 2007

(54) ELECTRONIC DEVICE WITH DISPLAY OF CONTINUOUSLY ADJUSTABLE AREA

(75) Inventor: Chih-Feng Yeh, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 257 days.

(21) Appl. No.: 11/163,214

(22) Filed: Oct. 10, 2005

(65) Prior Publication Data

US 2006/0176243 A1 Aug. 10, 2006

(30) Foreign Application Priority Data

Jan. 25, 2005 (TW) .............................. 94102129 A

(51) Int. Cl.
  *G08B 5/00* (2006.01)
  *G08B 5/22* (2006.01)
  *G09G 3/00* (2006.01)
(52) U.S. Cl. ............................ 340/815.83; 340/815.4; 345/30; 345/905
(58) Field of Classification Search ........... 340/815.83, 340/815.4, 815.49, 691.1, 691.6, 539.11, 340/693.5; 455/403, 90.3, 556.2, 575.1, 455/575.3, 575.4; 345/30, 38, 905
See application file for complete search history.

(56) References Cited

U.S. PATENT DOCUMENTS 6,680,724 B2   1/2004  Lichtfuss
7,050,835 B2 * 5/2006  Hack et al. .................. 455/566
7,136,688 B2  11/2006  Jung et al.
7,187,363 B2 * 3/2007  Nguyen et al. ............. 345/168
2005/0040962 A1 * 2/2005  Funkhouser et al. ...... 340/815.4
2006/0034039 A1   2/2006  Van Rens

FOREIGN PATENT DOCUMENTS

CN         1535044 A       10/2004
TW         M251169         11/2004
WO    WO 2004/031927 A2    4/2004

\* cited by examiner

*Primary Examiner*—Toan N. Pham
(74) *Attorney, Agent, or Firm*—Winston Hsu

(57) ABSTRACT

An electronic device with a display of a continuously adjustable area. The electronic device includes a frame, a flexible display panel, a detent unit and a recovering unit installed in the frame and connected with the display panel. The frame includes a surface and a window formed on the surface. The flexible display panel, longer than the window, is partially exposed in the window and partially within the frame. The detent unit includes two arresting elements established in the flexible display panel and the window separately. The two arresting elements are capable of generating mutual interference. The relative motion between the flexible display panel and the window is not affected when an external force is greater than the interference. Therefore the electronic device has a display with a continuously adjustable area.

10 Claims, 9 Drawing Sheets

ELECTRONIC DEVICE WITH DISPLAY OF CONTINUOUSLY ADJUSTABLE AREA

BACKGROUND OF THE INVENTION

1. Field of the Invention

The present invention relates to an electronic device, and more particularly, to an electronic device with a display of a continuously adjustable area.

2. Description of the Prior Art

Along with the prosperity of digital audio and video technology and the popularity of wireless networks, the electronic devices, such as cell phones, personal digital assistants (PDA) and multi-media players, become the main stream products in the consumer electronics market. To minimize the volume, to reduce the weight, and to enhance the functions are the primary issues of electronic elements and products nowadays.

For the modern electronic device, it usually comprises a main frame and a liquid crystal display (LCD) panel embedded in the front of the main frame. The liquid crystal display panel adopts a back-light module, color attachment lenses, polariscopes, alignment layers and unit linings. Compared to traditional cathode-ray-tube displays, the liquid crystal display panels are more preferred because they are lighter in weight and smaller in volume, produce lower radiation, and consume less power.

However, for the small sizes of modern mobile electronic devices and the inflexibility of the adopted liquid crystal display panels, consumers cannot enjoy the optimum video impression because the display areas are limited to the window sizes of the mobile electronic devices. Furthermore, the liquid crystal display panel has to adopt a back light module, which is a main restriction against reduction of the volume and the weight of mobile electronic devices.

SUMMARY OF THE INVENTION

It is therefore a primary objective of the claimed invention to provide an electronic device of which a display area can be continuously adjusted.

Briefly described, the claimed invention discloses an electronic device with a display of a continuously adjustable area. The electronic device comprises a frame, a flexible display panel, a detent unit and a recovering unit. The frame includes a surface defined with a first direction, a capacity, and a window formed on the surface and interlinking the capacity. The flexible display panel has a predetermined length longer than a length of the window in the first direction, a first side and an opposite second side, and a first section and a second section between the first side and the second side. The detent unit includes a first arresting element and a second arresting element established in the flexible display panel and the window separately. The first arresting element and the second arresting element are capable of generating mutual interference. The relative motion between the flexible display panel and the window is not affected when an external force is greater than the interference. When the first side is pulled in the first direction away from the window, a part of the first section leaves the window and a part of the second section is exposed in the window; and when the external force pulling the first side vanishes, the detent unit may position the flexible display panel. The recovering unit is located in the capacity for recovering the exposed part of the second section, including a first end connected to the second side of the flexible display panel and a second end connected to the frame.

The present invention utilizes a flexible display panel with a predetermined length longer than the length of the window to implement an adjustable display area. The present invention further adopts the detent unit for positioning in order to provide an electronic device with a display of a continuously adjustable area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
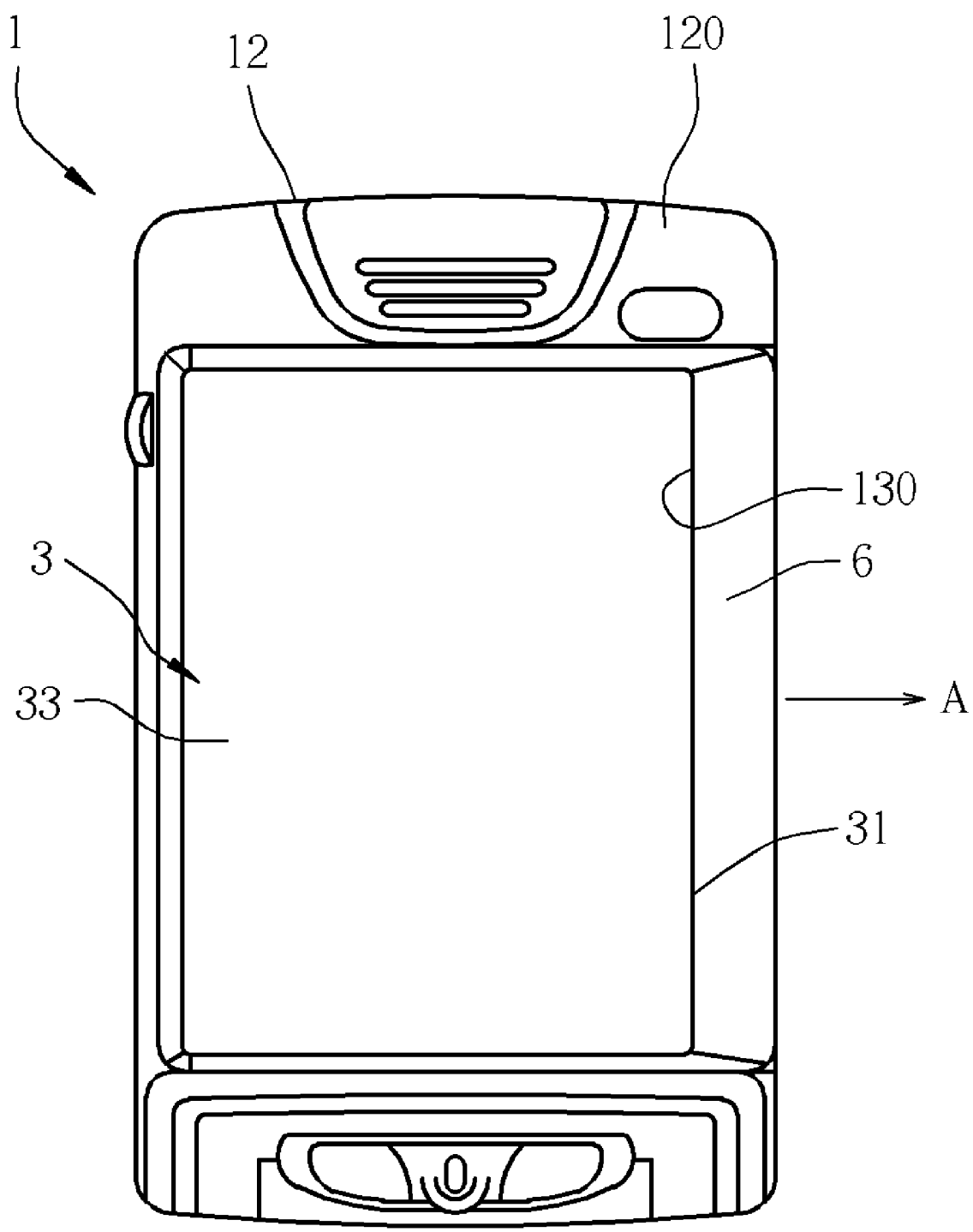
FIG. 1 is a front view of an embodiment of the claimed electronic device with a display of an adjustable area.
Figure 2:
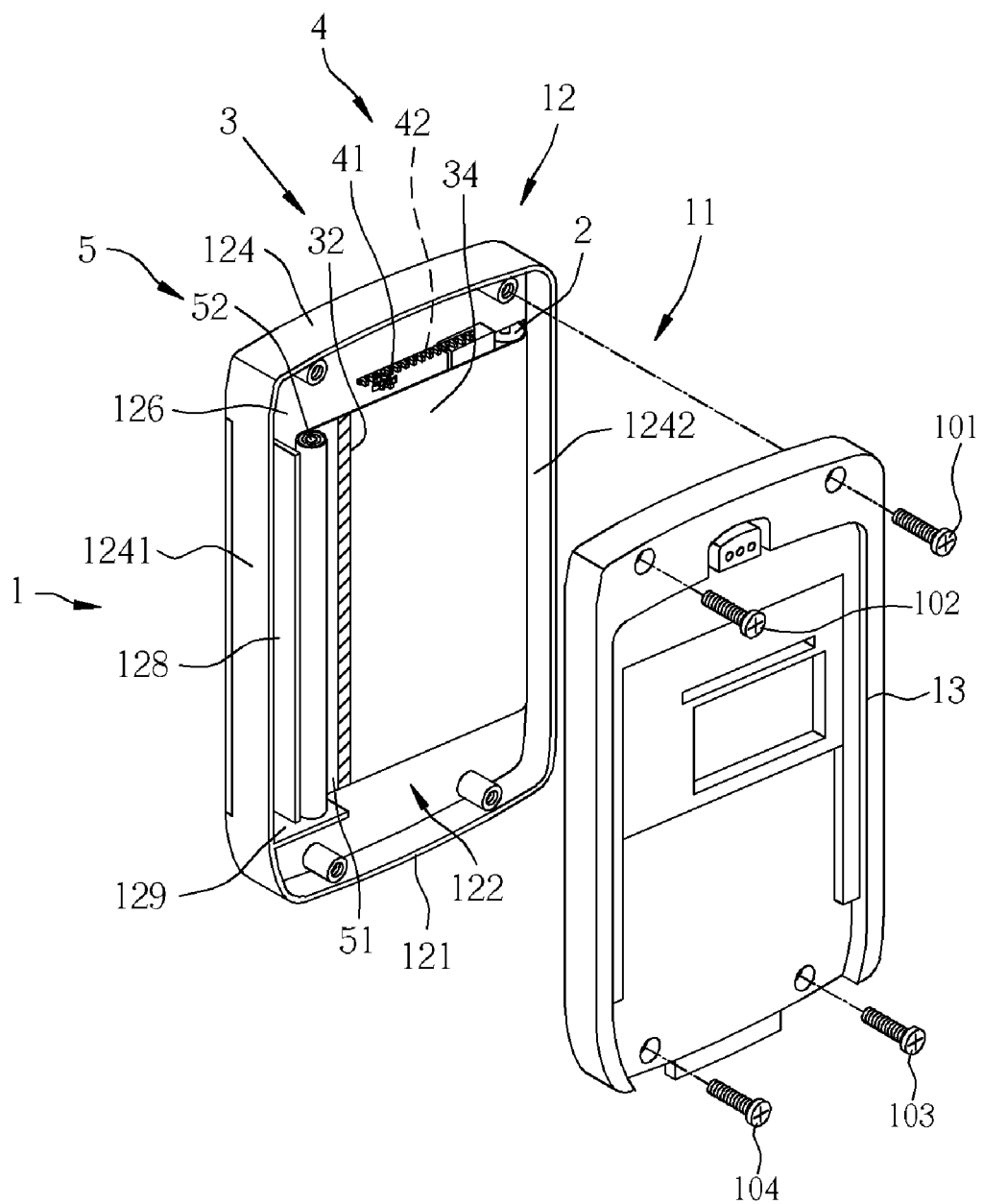
FIG. 2 is a three-dimensional back view, illustrating a main frame and a back cover of the embodiment of the claimed electronic device.
Figure 3:
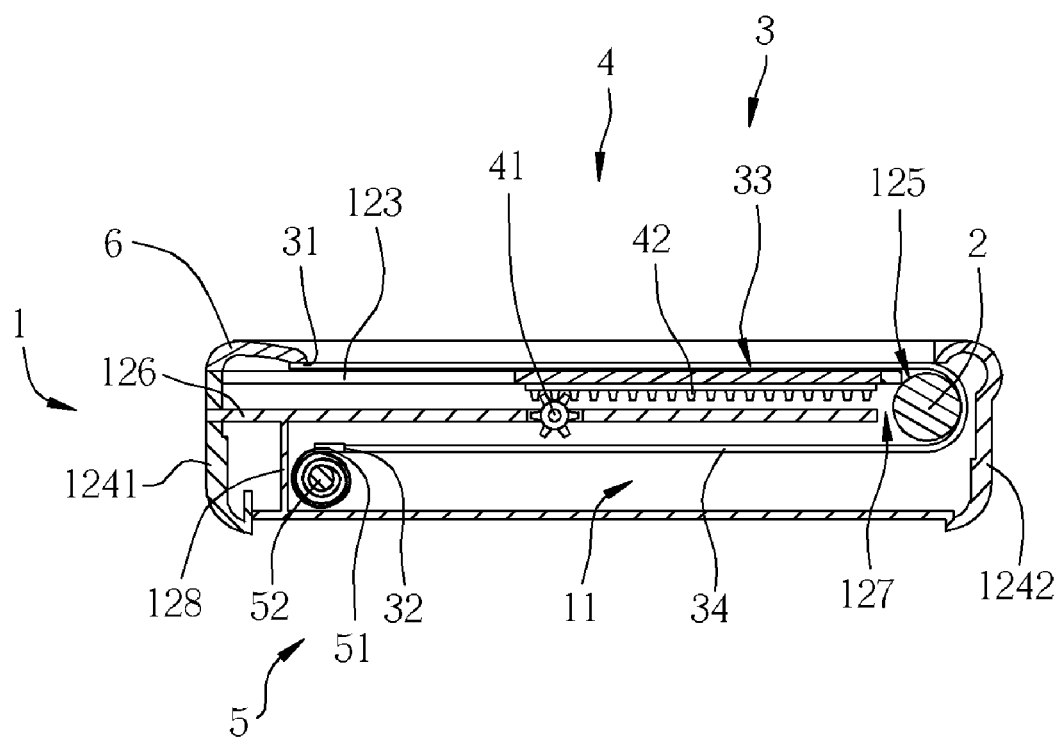
FIG. 3 is a cutaway view, illustrating the assembly of a detent unit and a frame of the embodiment of the claimed electronic device.

Please refer to FIGS. 1, 2, and 3. FIG. 1 is a front view of an embodiment of the claimed electronic device with a display of a continuously adjustable area. FIG. 2 is a three-dimensional back view, illustrating a main frame and a back cover of the embodiment of the claimed electronic device. FIG. 3 is a cutaway view, demonstrating the assembly of a detent unit and a frame of the embodiment of the claimed electronic device. The present embodiment of the claimed electronic device includes a frame 1, a leading element 2, a flexible display panel 3, a detent unit 4, a recovering unit 5, a pulling element 6, a counter 7, and a controller 8.

The present embodiment of the claimed electronic device may comprise a personal digital assistant (PDA), a cell phone, a multi-media player, or some other product. The frame 1 includes a main frame 12 and a back cover 13, which are coupled together and form a boundary of the capacity 11. In the present embodiment, the back cover 13 is fixed with the main frame 12 by a plurality of fasteners 101, 102, 103 and 104.

The main frame 12 includes a surface 120 and a bottom 121 opposite to the surface 120. A first direction and a second direction parallel to the first direction are defined on the surface 120. In the present embodiment, the first direction is represented as an X-axis. The bottom 121 forms a containing channel 122 interlinking the capacity 11, a channel bottom part 123 as a boundary of the bottom of the containing channel 122, and a surrounding surface 124 as a boundary of the surroundings of the containing channel 122. An upward penetrant channel 125 is formed on the bottom 121 and extending to the channel bottom part 123, wherein the width of the upward penetrant channel 125 is narrower than the containing channel 122.

The surrounding surface 124 includes a left wall 1241 and a right wall 1242 aligned in order in the first direction. The main frame 12 further includes a first partition 126 extending from the left wall 1241 toward to the right wall 1242 in the first direction, a downward penetrant channel 127 formed on the first partition 126 and interlinking the containing channel 122, a second partition 128 extending from the first partition 126 toward to the back cover 13, and a third partition 129 extending from the left wall 1241 toward to the right wall 1242 in the first direction. Besides, the main frame 12 includes a window 130 formed on the surface 120 and interlinking the containing channel 122.

In the present embodiment, the leading element 2 is a round shaft perpendicular to the first direction, rotatably established in the capacity 11 between the upward penetrant channel 125 and the downward penetrant channel 127. The leading element 2 is utilized to lead the flexible display panel 3, such that the flexible display panel 3 can partially enter the capacity 111 along the leading element 2.

In the present embodiment, the flexible display panel 3 is an organic light emitting display (OLED) panel. The flexible display panel 3, electrically connected to the main frame 12 of the frame 1, with a predetermined length longer than a length of the window 130 in the first direction, includes a first side 31 and an opposite second side 32, and a first section 33 and a second section 34 between the first side 31 and the second side 32. The length of the first section 33 is about the length of the window 130. The flexible display panel 3 further detours around the leading element 2 such that the second section 34 is within the capacity 11. In the present embodiment, the minimum curve radius of the flexible display panel 3 is close to a curvature ratio of the leading element 2. Therefore, the uneven stress distributed on the flexible display panel 3 may be avoided, and the lifetime of the product may be increased.

Figure 5:
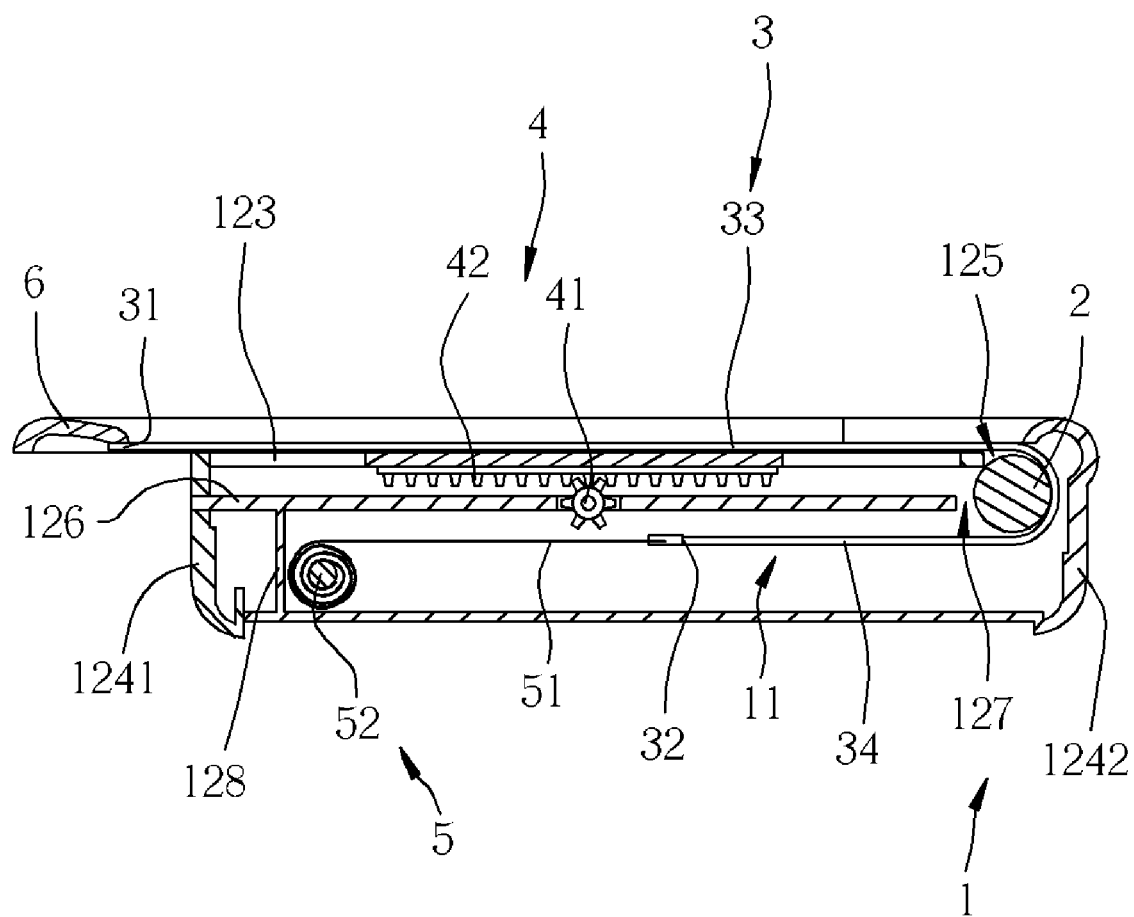
FIG. 5 is a cutaway view of the embodiment of the claimed electronic device, illustrating the detent unit of the embodiment being capable of positioning the flexible display panel.
Figure 9:
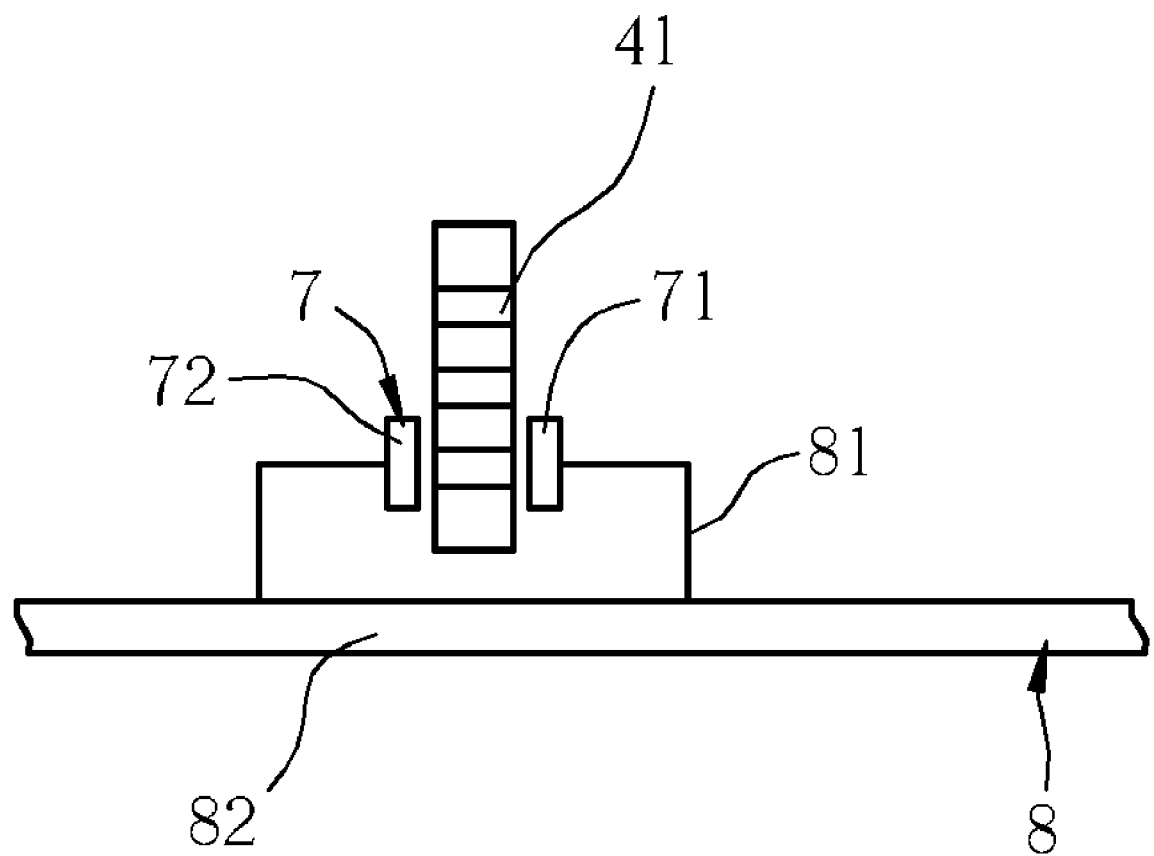
FIG. 9 is a partial enlargement diagram illustrating the assembly of a first arresting element, a counter, and a controller of the embodiment of the claimed electronic device.

Please refer to FIG. 5 and FIG. 9 together with FIG. 3. Similar to FIG. 3, FIG. 5 shows that the detent unit of the embodiment is capable of positioning the flexible display panel. FIG. 9 is a partial enlargement diagram, illustrating the assembly of a first arresting element, a counter, and a controller of the present embodiment. As demonstrated in FIGS. 3, 5 and 9, the detent unit 4 includes a first arresting element 41 established in the window 130, and a second arresting element 42 established on the flexible display panel 3 opposite to the first arresting element 41. The first arresting element 41 is capable of generating interference against the second arresting element 42. If an external force larger than the interference exists, the relative motion between the flexible display panel 3 and the window 130 will not be affected. In the present embodiment, the first arresting element 41 is a gear and the second arresting element 42 is a rack.

As illustrated in the figures, the recovering unit 5 is a torsion fragment for recovering the exposed part of the second section 34. The recovering unit 5 is settled in the capacity 111 among the first partition 126, the second partition 127, the third partition 129, and the surrounding surface 124. The recovering unit 5 includes a first end 51 located marginally, connected to the second side 32 of the flexible display panel 3, and a second end 52 located centrally, connected to the frame 1. In the present embodiment, the first end 51 of the recovering unit is bound to the second side 32 of the flexible display panel 3 with adhesive.

The pulling element 6 has a shape of C, and is established at an end of the first section 33 away from the second section 34 for functioning conveniently.

The counter 7 is utilized to detect a moving distance of the second arresting element 42 relative to the first arresting element 41. Accordingly, the controller 8 obtains the length of the exposed part of the flexible display panel 3. The counter 7 includes an emitter 71 established on the main frame 12 and located at a side of the first arresting element 41, and a receiver 72 established on the main frame 12 and located at another side of the first arresting element 41 for receiving signals from the emitter 71. The counter 7 may be an optical grating counter or other type of counter.

The controller 8 includes a plurality of wires 81 electrically connected to the counter 7 for transmitting signals, and a control circuit 82 installed within the main frame 12 for analyzing and processing signals. The control circuit 82 may generate control signals accordingly, provide a size of the display area corresponding to the control signal, and further display on the flexible display panel 3.

Figure 4:
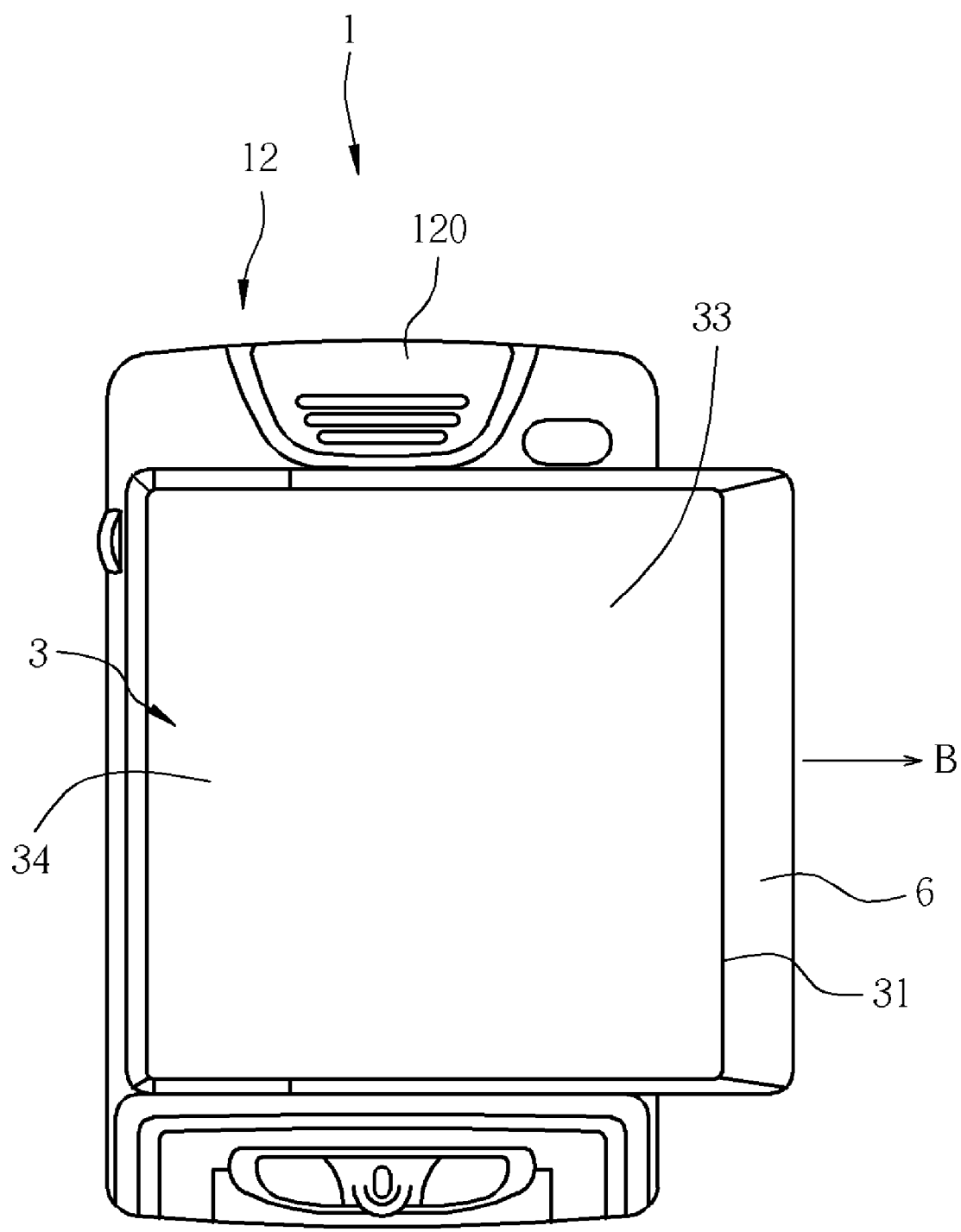
FIG. 4 is a front view of the embodiment of the claimed electronic device, illustrating the flexible display panel being pulled in the direction of the arrow B.

Please refer to FIG. 1, FIG. 4 and FIG. 5. FIG. 4 is a diagram illustrating the flexible display panel being pulled along the direction of the arrow B. When the pulling element 6 is pulled in the first direction, the first side 31 will move along the direction pointed by the arrow B away from the window 130. A part of the first section 33 will leave the window 130 then, consequently a part of the second section 34 will detour around the leading element 2 and be exposed in the window 130. When the pulling force disappears, the detent unit 4 can position the flexible display panel 3.

Figure 6:
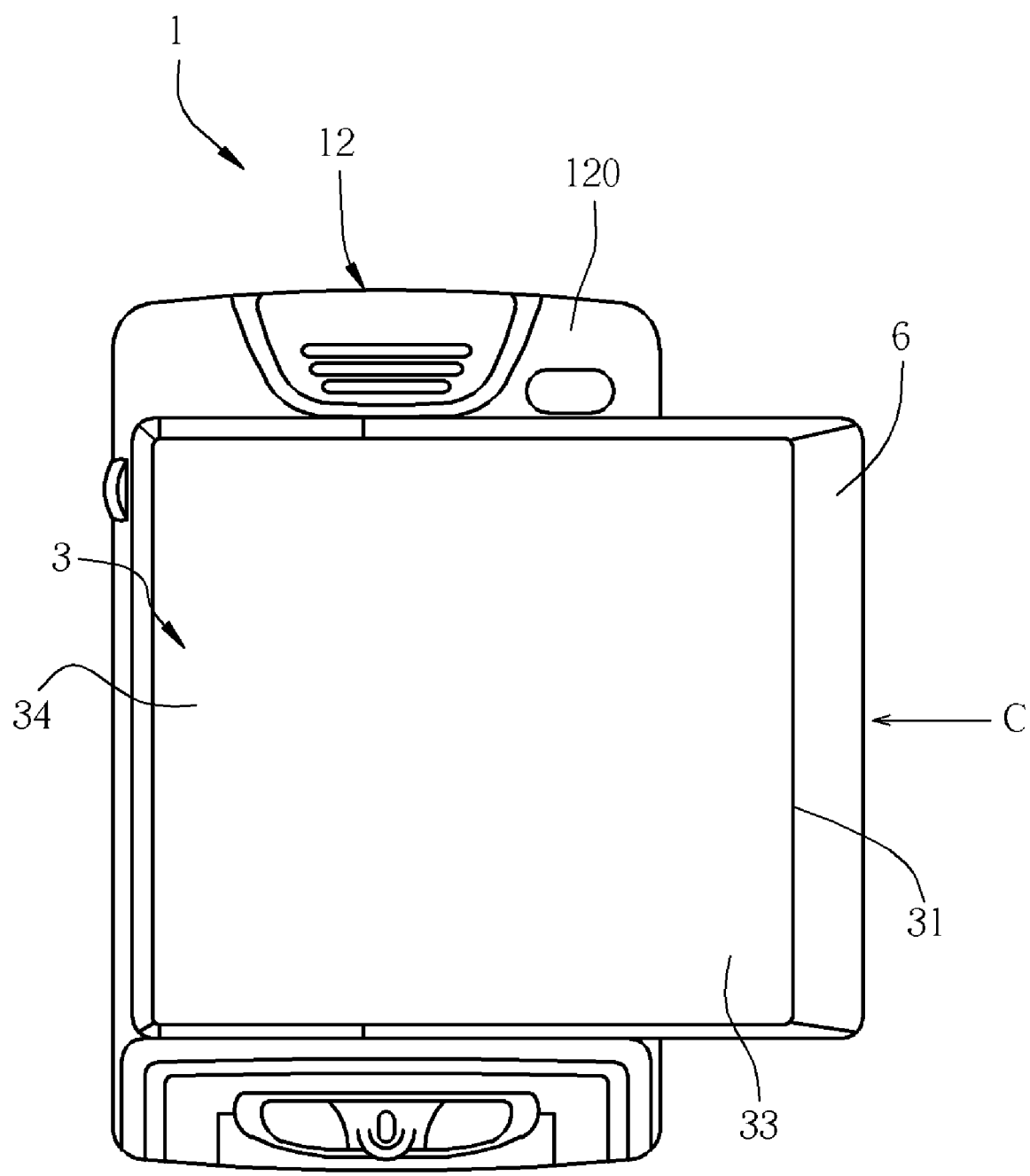
FIG. 6 is a front view of an embodiment of the claimed electronic device, illustrating the flexible display panel being pulled in the direction of the arrow B in FIG. 4.
Figure 7:
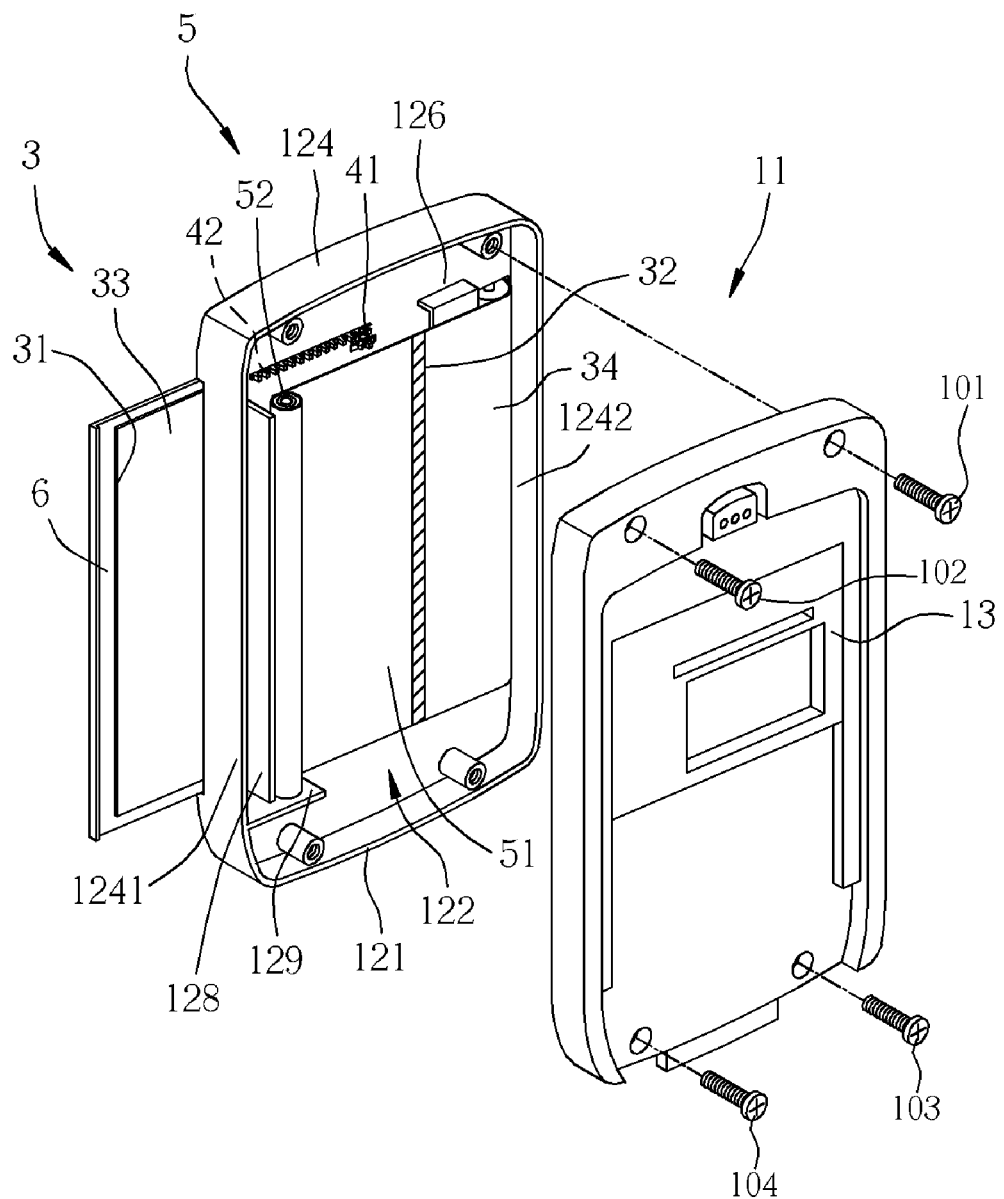
FIG. 7 is a three-dimensional back view of an embodiment of the claimed electronic device, illustrating a recovering element of the present embodiment.
Figure 8:
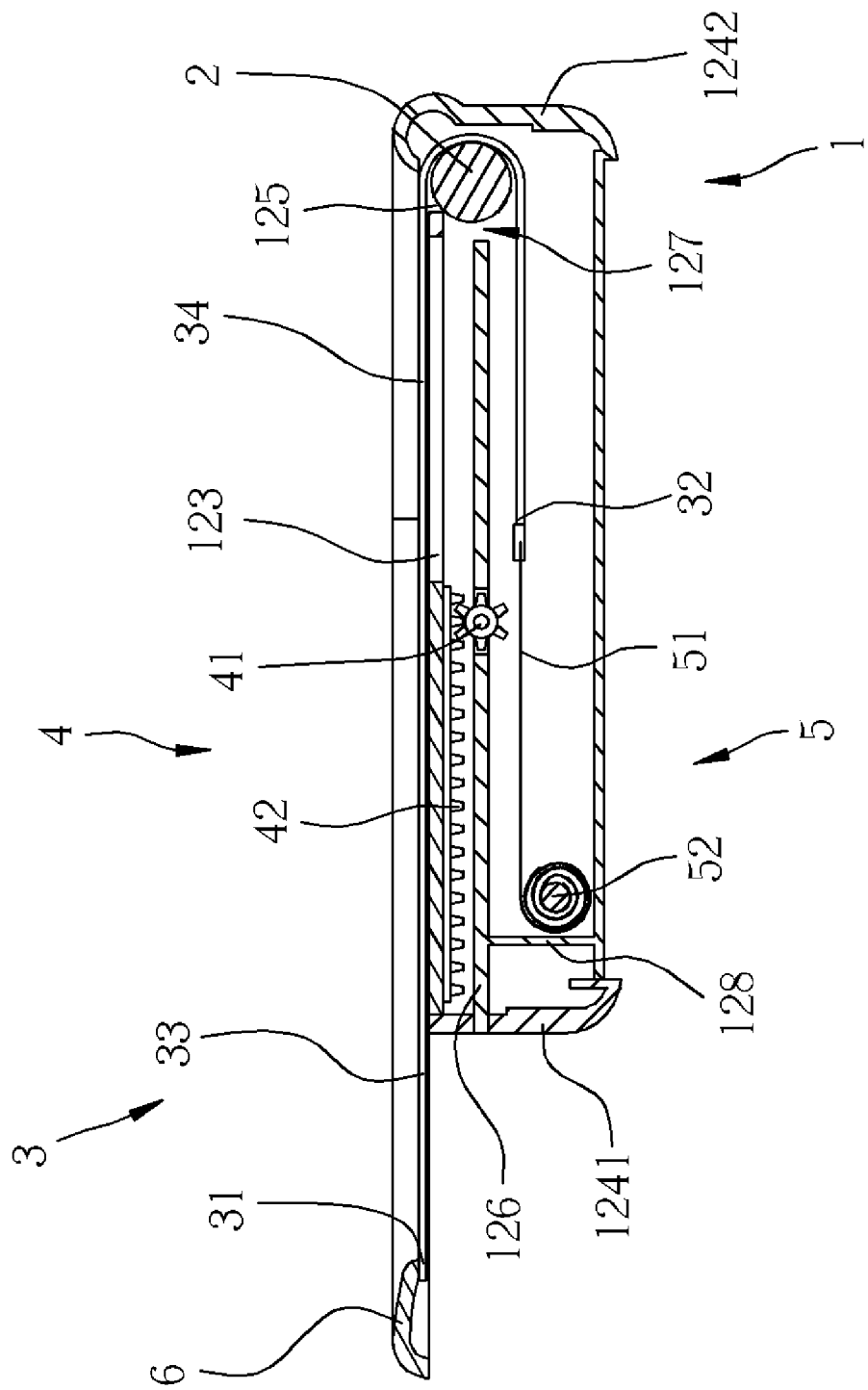
FIG. 8 is a cutaway view of an embodiment of the claimed electronic device, illustrating the detent unit being capable of positioning the flexible display panel.

Please refer to FIGS. 6, 7 and 8. FIG. 6 is a diagram demonstrating the flexible display panel being pulled in the direction of the arrow B in FIG. 4. FIG. 7 is a three-dimensional back view illustrating a recovering element of the present embodiment. FIG. 8 is a cutaway view illustrating the detent unit positioning the flexible display panel. When the pulling element 6 is pulled along the first direction to an extreme, the first side 31 keeps moving in the direction of the arrow B in FIG. 4 away from the window 130, the first section 33 leaves from the window 130 partially, and a part of the second section 34 consequently detours around the leading element 2 and is further exposed in the window 130. When the external force vanishes, the detent unit 4 positions the flexible display panel 3. When the leading element 6 is pushed in the direction opposite to the first direction, the first side 31 moves toward to the window 130 in the direction pointed by the arrow C in FIG. 6, the first section 33 moves toward to the window 130, and the exposed part of the second section 34 is retrieved by the recovering unit 5 and further detours around the leading element 6 to enter the capacity 11. When the external force pushing the leading element 6 in the direction opposite to the first direction disappears, the detent unit 4 may position the flexible display panel 3.

In summary, the claimed invention provides an electronic device, wherein the adopted flexible display panel 3 can be pulled such that the second section 34 of the flexible display panel 3 may be partially exposed in the window 130 in order to adjust the size of the display area. The claimed electronic device further utilizes the detent unit 4 to position the flexible display panel 3 in the window 130 so that the size of the display area can be adjusted continuously. Moreover, the flexible display panel may be an organic light emitting display (OLED) panel, which does not need to be equipped with a back light module. Therefore, the present invention provides an electronic device with an adjustable display area, which is lighter in weight, smaller in volume, and cheaper in cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with a display of a continuously adjustable area, the electronic device comprising:
   a frame comprising:
      a surface defined with a first direction;
      a capacity; and
      a window formed on the surface and interlinking the capacity;
   a flexible display panel having a predetermined length longer than a length of the window along the first direction, the flexible display panel comprising:
      a first side;
      a second side opposite to the first side; and
      a first section and a second section between the first side and the second side;
   a detent unit comprising:
      a first arresting element and a second arresting element established in the flexible display panel and the window separately;
   wherein the first arresting element and the second arresting element are capable of generating interference; the relative motion between the flexible display panel and the window is not affected when an external force is greater than the interference; when the first side is pulled in the first direction away from the window, a part of the first section leaves the window and a part of the second section is exposed in the window; and when the external force pulling the first side finishes, the detent unit may position the flexible display panel; and
   a recovering unit located in the capacity for recovering the exposed part of the second section, the recovering unit comprising:
      a first end connected to the second side of the flexible display panel; and
      a second end connected to the frame.

2. The electronic device of claim 1 wherein the flexible display panel is an organic light emitting display (OLED) panel.

3. The electronic device of claim 1 wherein the recovering unit is a torsion fragment, the first end of the recovering unit is located marginally, and the second end of the recovering unit is located centrally.

4. The electronic device of claim 1 further comprising a leading element oriented perpendicular to the first direction, able to rotate around the axis of itself, and established in the capacity.

5. The electronic device of claim 4 wherein the flexible display panel has a minimum curve radius close to a curvature ratio of the leading element.

6. The electronic device of claim 1 further comprising a pulling element for helping pulling, established at an end of the first section away from the second section.

7. The electronic device of claim 1 wherein the first arresting element is a gear and the second arresting element is a rack.

8. The electronic device of claim 7 wherein the first arresting element is established in the window and the second arresting element is established in the flexible display panel oppositely.

9. The electronic device of claim 1 further comprising:
   a counter capable of detecting a moving distance of the detent unit, wherein the counter is established on the frame; and
   a controller capable of adjusting the display area of the electronic device, wherein the controller is established on the frame and is electrically connected to the detent unit.

10. The electronic device of claim 9 wherein the counter is an optical grating counter.

* * * * *